United States Patent Office 3,085,980

Patented Apr. 16, 1963

3,085,980

FERROMAGNETIC MATERIAL

Evert Willem Gorter, Johannes Antonius Schulkes, and Jan Verweel, all of Eindhoven, Netherlands, assignors to North American Philips Company Inc., New York, N.Y., a corporation of Delaware No Drawing. Filed June 1, 1959, Ser. No. 817,029
Claims priority, application Netherlands May 31, 1958
15 Claims. (Cl. 252—62.5)

This invention relates to ferromagnetic materials which have valuable electromagnetic properties.

The ferromagnetic material according to the invention has a crystal structure similar to that of the mineral garnet and is characterized by a composition according to the formula $$Y_{3-a-b}Ca_aCe_bFe_{2-m-n}Ti_mMg_nFe_{3-x-y}Si_xBe_yO_{12}$$

wherein $0 \leqq a \leqq 2.7$ $\quad 0 \leqq n \leqq 1.5$
$0 \leqq b \leqq 0.3$ $\quad 0 \leqq x \leqq 2.7$
$0 \leqq m \leqq 1.2$ $\quad 0 \leqq y \leqq 0.5$ $$a+b+m+n+x+y \neq 0$$

As compared with known materials, the materials according to the invention have improved properties in several respects. These properties are a higher value of the initial permeability, a lower value of the saturation magnetisation, which when used in microwave equipment is important for comparatively long wave-lengths and a lower value of the losses.

Materials in which in the said formula $0 < a \leqq 1.2$ $\quad x=0$
$b=0$ $\quad y=0$
$0 < m \leqq 1.2$ $\quad a=m$
$n=0$ have a higher value of initial permeability and lower electromagnetic losses as compared with the material $Y_3Fe_2Fe_3O_{12}$.

Materials, in which in the said formula $0 < a \leqq 2.7$ $\quad x=0$
$b=0$ $\quad y=0$
$0 < m \leqq 1.2$ $\quad a > m$
$n=0$ have a higher value for the initial permeability, while the electromagnetic losses are very low.

Materials, in which in the said formula $0 < a \leqq 2.7$ $\quad 0 \leqq x \leqq 2.7$
$b=0$ $\quad y=0$
$m=0$ $\quad a > x$
$n=0$ have very low values for the electromagnetic losses. The same is true of the materials in which in the said formula $a=0$ $\quad 0 < n \leqq 1.5$
$0 \leqq b \leqq 0.3$ $\quad x=0$
$0 \leqq m \leqq 1.2$ $\quad y=0$ and of the materials in which in the said formula $a=0$ $\quad 0 \leqq x < 0.5$
$0 \leqq b \leqq 0.3$ $\quad 0 < y \leqq 0.5$
$m=0$ $\quad y > b+x$
$n=0$ Materials, in which in the said formula $0 < a \leqq 2.7$ $\quad 0 < x \leqq 2.7$
$b=0$ $\quad y=0$
$m=0$ $\quad a=x$
$n=0$ have lower values for the magnetic saturation than the material $Y_3Fe_2Fe_3O_{12}$. The same is true of the materials in which in the said formula $a=0$ $\quad x=0$
$0 < b \leqq 0.3$ $\quad 0 < y \leqq 0.3$
$m=0$ $\quad b=y$
$n=0$ and of materials in which in the said formula $a=0$ $\quad 0 < x \leqq 0.5$
$b=0$ $\quad 0 < y \leqq 0.5$
$m=0$ $\quad x=y$
$n=0$ The materials according to the invention are preferably manufactured by sintering a finely-divided mixture, chosen approximately in the correct ratio, of the component metal oxides of the new compounds. It is naturally possible to replace the metal oxides by compounds converting into metal oxides upon heating, for example, carbonates, oxalates and acetates. The term "correct ratio" is to be understood herein to mean a ratio of the amounts of metals in the initial mixture equal to that in the materials to be manufactured. If desired, the finely-divided initial mixture may first be presintered, the reaction product again pulverized and the resultant powder again sintered, which series of operations may be repeated, if desired, once or several times. The sintering process for the final sintering process takes place between 1200 and 1500° C. preferably between 1350 and 1450° C., for about one to ten hours in a gaseous atmosphere having a content of oxygen higher than air. With the materials having a high content of calcium and silicon the sintering process preferably takes place between 1200° C. and 1300° C.

Bodies consisting of the novel ferromagnetic materials may be obtained either by sintering the initial mixture of the metal oxides or the like already at the beginning in the desired shape or by pulverizing the reaction product of the pre-sintering process and shaping it, if desired after the addition of a binder, into the desired form and subjecting it to a final sintering process.

*Example*

Mixtures of yttrium oxide, calcium carbonate, titanium oxide, magnesium carbonate, silicon oxide and ferric oxide were ground in the dry state in a porcelain mortar for 15 minutes. The mixtures were pre-sintered in oxygen at 1400° C. for 2 hours. The reaction products were subsequently pulverized with the use of ethyl alcohol in an agate mortar for 5 minutes and then ground in a shaking mill with the use of ethyl alcohol for 4 hours. After drying and addition of some drops of water, the powders were moulded to form rings, which were heated at 1400° C. in an atmosphere containing principally oxygen for 4 hours.

Properties of such rings are specified in the table below, viz, the saturation magnetisation, $4\pi M_s$, expressed in Gauss, the real part of the initial permeability, $\mu'$, and the electro-magnetic loss factor tan $\delta$, at different frequencies for comparison purposes the properties of the material $Y_3Fe_2Fe_3O_{12}$ are also specified.

| | $4\pi M_s$ | 1 kc./s. | | 30 kc./s. | | 400 kc./s. | | 3 Mc./s. | |
|---|---|---|---|---|---|---|---|---|---|
| | | $\mu'$ | $\tan\delta$ | $\mu'$ | $\tan\delta$ | $\mu'$ | $\tan\delta$ | $\mu'$ | $\tan\delta$ |
| $Y_3Fe_2Fe_3O_{12}$ | 1,700 | 90 | [5] 0.02 | 80 | 0.07 | 60 | 0.20 | | |
| $Y_{2.75}Ca_{0.25}Fe_{1.75}Ti_{0.25}Fe_3O_{12}$ | 1,570 | 160 | | 150 | 0.18 | | | | |
| $Y_{2.5}Ca_{0.5}Fe_{1.5}Ti_{0.5}Fe_3O_{12}$ | 1,600 | 320 | | 270 | 0.11 | | | | |
| $Y_{2.4}Ca_{0.6}Fe_{1.4}Ti_{0.6}Fe_3O_{12}$ | 1,510 | 420 | 0.04 | 320 | 0.14 | 220 | 0.13 | | |
| $Y_{2.3}Ca_{0.7}Fe_{1.3}Ti_{0.7}Fe_3O_{12}$ | 1,440 | 370 | 0.04 | 320 | 0.12 | 300 | 0.05 | | |
| $Y_2CaFeTiFe_3O_{12}$ | 900 | 220 | | | | | | | |
| $Y_{2.38}Ca_{0.62}Fe_{1.4}Ti_{0.6}Fe_3O_{12}$ | | 325 | 0.04 | 300 | 0.05 | 270 | 0.04 | | |
| $Y_{2.28}Ca_{0.72}Fe_{1.3}Ti_{0.7}Fe_3O_{12}$ | | 340 | 0.05 | 310 | 0.05 | | | | |
| $Y_3Fe_{1.991}Mg_{0.009}Fe_3O_{12}$ | | 80 | 0.01 | 80 | 0.01 | 80 | 0.025 | 80 | 0.02 |
| $Y_3Fe_{1.94}Mg_{0.06}Fe_3O_{12}$ | | 50 | 0.02 | 50 | 0.02 | 50 | 0.01 | 50 | 0.01 |
| $Y_{2.95}Ca_{0.05}Fe_2Fe_3O_{12}$ | | 70 | 0.01 | 70 | 0.01 | 70 | 0.01 | 70 | 0.01 |
| $Y_{2.9}Ca_{0.1}Fe_2Fe_3O_{12}$ | | 50 | 0.01 | 50 | 0.01 | 50 | 0.01 | 50 | 0.01 |
| $Y_{2.75}Ca_{0.25}Fe_2Fe_{2.75}Si_{0.25}O_{12}$ | 1,220 | | | | | | | | |
| $Y_{2.5}Ca_{0.5}Fe_2Fe_{2.5}Si_{0.5}O_{12}$ | 900 | | | | | | | | |
| $Y_{2.25}Ca_{0.75}Fe_2Fe_{2.25}Si_{0.75}O_{12}$ | 460 | | | | | | | | |
| $Y_{1.5}Ca_{1.5}Fe_2Fe_{1.5}Si_{1.5}O_{12}$ | 560 | | | | | | | | |

What is claimed is:

1. A ferromagnetic material having a crystal structure similar to that of the mineral garnet and a composition according to the formula $$Y_{3-a-b}Ca_aCe_bFe^{++}_{2-m-n}Ti_mMg_nFe^{+++}_{3-x-y}Si_xBe_yO_{12}$$

wherein

*a* is not greater than 2.7
*b* is not greater than 0.3
*m* is not greater than 1.2
*n* is not greater than 1.5
*x* is not greater than 2.7
*y* is not greater than 0.5
$a+b+m+n+x+y$ is not less than 0.009
$a+b$ is not greater than 2.7 and $x+y$ is not greater than 2.7

2. A ferromagnetic material as defined in claim 1, in which

*a* is greater than zero and not greater than 1.2
$b=0$
*m* is greater than zero and not greater than 1.2
*n* equals zero
*x* equals zero
*y* equals zero
*a* equals *m*

3. A ferromagnetic material as defined in claim 1, in which

*a* is greater than zero and not greater than 2.7
$b=0$
*m* is greater than zero but not greater than 1.2
$n=0$
$x=0$
$y=0$
*a* is greater than *m*

4. A ferromagnetic material as defined in claim 1, in which

*a* is greater than zero but not greater than 2.7
$b=0$
$m=0$
$n=0$
*x* is less than 2.7
$y=0$
*a* is greater than *x*

5. A ferromagnetic material as defined in claim 1, in which $a=0$
*b* is not greater than 0.3
*m* is not greater than 1.2
*n* is greater than zero and not greater than 1.5
$x=0$
$y=0$
*n* is greater than $b+m$ 6. A ferromagnetic material as defined in claim 1, in which

*a* equals zero
*b* is not greater than 0.3
*m* equals zero
*n* equals zero
*x* is less than 0.5
*y* is not greater than 0.5
*y* is greater than $b+x$ 7. A ferromagnetic material as defined in claim 1, in which

*a* is greater than 0 and not greater than 2.7
*b* equals zero
*m* equals zero
*n* equals zero
*x* is greater than 0 and not greater than 2.7
*y* equals zero
*a* equals *x*

8. A ferromagnetic material as defined in claim 1, in which

*a* equals zero
*b* is greater than zero and not greater than 0.3
*m* equals zero
*n* equals zero
*x* equals zero
*y* is greater than zero and not greater than 0.3
*b* equals *y*

9. A ferromagnetic material as defined in claim 1, in which

*a* equals zero
*b* equals zero
*m* equals zero
*n* equals zero
*x* is greater than zero and less than 0.5
*y* is greater than zero and less than 0.5
$x=y$ 10. A ferromagnetic body consisting essentially of a highly-coherent sintered mass of crystals having a crystal structure similar to the mineral garnet, said crystals having a composition corresponding to the formula $$Y_{3-a-b}Ca_aCe_bFe^{++}_{2-m-n}Ti_mMg_nFe^{+++}_{3-x-y}Si_xBe_yO_{12}$$

wherein

*a* is not greater than 2.7
*b* is not greater than 0.3
*m* is not greater than 1.2
*n* is not greater than 1.5
*x* is not greater than 2.7
y is not greater than 0.5
$a+b+m+n+x+y$ is not less than 0.009
$a+b$ is not greater than 2.7 and $x+y$ is not greater than 2.7

11. A method of manufacturing a ferromagnetic material having a crystal structure similar to the mineral garnet comprising the steps, forming a mixture of yttrium oxide, calicum oxide, cerium oxide, iron oxide, titanium oxide, magnesium oxide, silicon oxide and beryllium oxide in proportions corresponding to a composition having the formula $$Y_{3-a-b}Ca_aCe_bFe^{++}_{2-m-n}Ti_mMg_nFe^{+++}_{3-x-y}Si_xBe_yO_{12}$$

in which $a$ is not greater than 2.7
$b$ is not greater than 0.3
$m$ is not greater than 1.2
$n$ is not greater than 1.5
$x$ is not greater than 2.7
$y$ is not greater than 0.5
$a+b+m+n+x+y$ is not less than 0.009
$a+b$ is not greater than 2.7 and $x+y$ is not greater than 2.7 and heating said mixture to a temperature of about 1200° to 1450° C. in an atmosphere having an oxygen content higher than air.

12. A method as defined in claim 11 in which the temperature at which the mixture is heated is between 1350° C. and 1450° C.

13. A method as defined in claim 11 in which the mixture after heating is pulverized and reheated to said temperature.

14. A method as defined in claim 11 in which for a mixture with a high content of calcium and silicon, the heating temperature is about 1200° C. to 1300° C.

15. A method as defined in claim 11 in which the mixture is compacted into a body and heated.

References Cited in the file of this patent

FOREIGN PATENTS 763,494 Great Britain ____________ Dec. 12, 1956

OTHER REFERENCES

Bertaut et al.: Comptes Rendus, vol. 242, pp. 382–384 (1956).

Aleonard et al.: Comptes Rendus, vol. 242, pp. 2531–2533 (1956).

Pauthenet: Comptes Rendus, vol. 243, pp. 1499–1502 (1956).

Maxwell et al.: Physical Review, Dec. 15, 1954, pp. 1503, 1504.

Epstein et al.: J. of Applied Physics, April 1959, p. 295S.